United States Patent [19]
Sutherland et al.

[11] Patent Number: 5,869,153
[45] Date of Patent: *Feb. 9, 1999

[54] DIMENSIONALLY HEAT-RECOVERABLE ARTICLE

[75] Inventors: Alistair Alfred Preston Sutherland; Sean Michael Lewington, both of Swindon, United Kingdom; Keith Nelson Melton, Cupertino, Calif.

[73] Assignee: Raychem Limited, Swindon, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 676,286

[22] PCT Filed: Jan. 20, 1995

[86] PCT No.: PCT/GB95/00106

§ 371 Date: Jul. 17, 1996

§ 102(e) Date: Jul. 17, 1996

[87] PCT Pub. No.: WO95/19879

PCT Pub. Date: Jul. 27, 1995

[30] Foreign Application Priority Data

Jan. 20, 1994 [GB] United Kingdom .................. 9401043

[51] Int. Cl.⁶ ............................. B65B 53/02; F16L 57/00; H01B 17/00
[52] U.S. Cl. ..................... 428/34.9; 428/35.1; 428/35.2; 428/192; 428/195; 428/212; 428/349; 428/913; 138/104; 156/84; 156/86; 174/35 R; 174/139

[58] Field of Search ................... 428/34.9, 35.1, 428/913, 35.2, 57, 192, 195, 212, 349; 174/35 R, 84 R, DIG. 8, 137 R, 138 C, 139; 156/84, 86; 138/104, 128, 156, 170

[56] References Cited

U.S. PATENT DOCUMENTS

| | | | |
|---|---|---|---|
| 3,885,015 | 5/1975 | Ono | 264/230 |
| 4,685,184 | 8/1987 | Satkamp | 29/148.4 |
| 5,369,225 | 11/1994 | Natwig et al. | 174/84 R |
| 5,393,932 | 2/1995 | Young et al. | 174/84 R |

FOREIGN PATENT DOCUMENTS

| | | |
|---|---|---|
| 0280404A1 | 8/1988 | European Pat. Off. . |
| 0501628A2 | 9/1992 | European Pat. Off. . |
| 7619898 | 6/1976 | France . |
| 2758094 | 3/1979 | Germany . |

*Primary Examiner*—Rena L. Dye
*Attorney, Agent, or Firm*—Herbert G. Burkard

[57] ABSTRACT

Heat-shrinkable sleeves of relatively opaque polymeric material having a relatively transparent integral strip (or other formation) to facilitate positioning of the sleeve on an article about which it is to be shrunk. The opaque portions of the sleeves preferably incorporate sufficient flame-retardant additives to compensate for the absence of such additives from the transparent portions, which transparent portions preferably occupy less of the sleeve surface than the opaque portions.

26 Claims, No Drawings

DIMENSIONALLY HEAT-RECOVERABLE ARTICLE

FIELD OF THE INVENTION

The present invention relates to dimensionally heat-recoverable articles.

BACKGROUND OF THE INVENTION

Dimensionally heat-recoverable articles are well known and are used for enclosing many substrates, for the provision of environmental sealing, mechanical protection and/or electrical insulation for example. Depending on the use to which the articles are to be put, the material from which the articles are made is often required to have one or more of a variety of different properties. This 'tailoring' of properties is often achieved by the incorporation of additives in a polymeric material. Examples of the types of additives that are used include antioxidants, reinforcing or non-reinforcing fillers, flame retardants, plasticisers, pigments, stabilisers and lubricants.

SUMMARY OF THE INVENTION

The present invention provides a novel form of article for enclosing at least part of a substrate, at least part of the article being dimensionally heat-recoverable polymeric material comprising in its heat-recoverable state (i) at least one relatively transparent portion and (ii) at least one relatively opaque portion. Preferably the position of the substrate can be detected through the said transparent portion when the substrate is enclosed by the article in use. The position may be detectable before or after or both before and after heat recovery of the article around the substrate.

In many cases, it will be preferred that the said opaque portion is heat-recoverable and/or the said transparent portion is heat-recoverable. The article may have a heat-recoverable wall, e.g. its outer enclosing wall, substantially wholly constituted by the said opaque and transparent portions.

Preferably the opaque portion(s) comprise(s) at least one additive, which additive is substantially absent, preferably completely absent, from the transparent portions. This has the advantage of permitting production of articles wherein the said additive is present in sufficient concentration in the opaque portions, and the opaque portions constitute a sufficient proportion of the article to achieve a preselected level of additive effect. Thus, additives which opacity the heat-recoverable material and are necessary to achieve specific characteristics, for example halogen-free flame retardant fillers, may be included so as to give the article as a whole a preselected level of the characteristic (e.g. flame-retardancy), while also providing for positional adjustment, for example by visual inspection by means of the additive-free transparent portions. Flame-retarded heat-recoverable articles have hitherto been impossible to make transparent except by use of halogenated materials, e.g. inherently transparent halogenated polymers.

The invention includes other possibilities, for example where the material other than the additive constituting the opaque portions has a characteristic other than opacity which is not present in the transparent portions, and the relative proportions of the opaque portions and transparent portions in the article are such as to achieve a pre-selected degree of the said characteristic in the article as a whole. Thus, it could be characteristics of relatively opaque polymers used in the opaque areas, rather than additives, which are imparted to the article as a whole while maintaining areas of transparency for visual inspection or other purposes.

At least in the broadest aspect of the invention, the fact that the article comprises at least one relatively transparent portion and at least one relatively opaque portion is intended to mean that at least one portion of the article allows at least some incident electromagnetic radiation to pass through it and at least one other portion of the article allows a smaller proportion (e.g. at least 30% less, preferably at least 50% less, more preferably at least 70% less) of the incident electromagnetic radiation to pass through it. For any particular embodiment of the invention the relative transparency or opacity of portions of the article may refer to a particular frequency or range of frequencies of electromagnetic radiation, for example frequencies in the infra red or microwave regions of the electromagnetic spectrum or indeed in any of the other regions of the spectrum. Preferably, the relative transparency or opacity of portions of the article according to the invention refers to relative transparency or opacity to visible light. In a particularly preferred embodiment of the invention at least part of the article which is relatively opaque is substantially opaque to visible light.

According to another aspect, the invention provides a method of enclosing at least part of a substrate, which comprises:

(a) placing an article according to the invention around at least part of the substrate;

(b) positioning the article with respect to the substrate by detecting the position of the substrate through at least part of the article which is relatively transparent; and (c) heating the article, thereby causing part at least of the article to recover about the substrate.

DESCRIPTION OF THE PREFERRED EMBODIMENTS

In preferred embodiments of the invention the article has portions which are relatively transparent or relatively opaque to visible light, and in this case the detection of the substrate will normally comprise viewing it through one or more relatively transparent portions of the article. Additionally or alternatively, where the relative transparency or opacity refers to non-visible regions of the electromagnetic spectrum, the detection of the substrate may be done using non-visible frequencies. In addition, once the article has been recovered, those parts of the substrate which are located under a relatively transparent portion of the article can normally be inspected, preferably visually. These advantages are often particularly useful when the article according to the invention is used to enclose a joint or connection between a plurality of elongate articles, for example pipes or elongate electrical conductors, including wires and cables. Furthermore, these advantages of location and inspection are normally obtained according to the invention whilst also maintaining the possibility of the article having properties which necessitate the use of relatively opaque material, for example flame retardancy, especially flame retardancy without the use of halogenated polymers, or relatively high absorption of infrared radiation in order to obtain fast heat-recoverability.

The article according to the invention may be formed by moulding e.g. injection moulding, or preferably by extrusion e.g. co-extrusion of the opaque and transparent materials. It may, for example, have an open configuration and be designed so that it can be wrapped around an elongate substrate without access to an end of the substrate, the edge portions of the article having a closure arrangement to retain them together at least during recovery of the article as described for example in U.S. Pat. No. 3,455,336, the disclosure of which is incorporated herein by reference. Preferably however, the article according to the invention is hollow, for example substantially tubular in shape.

The article according to this invention may be made from a polymeric material exhibiting the property of elastic or plastic memory as described, for example, in U.S. Pat. Nos. 2,027,962, 3,086,242 and 3,597,372, the disclosures of which are incorporated herein by reference. As is made clear in, for example, U.S. Pat. No. 2,027,962, the originally dimensionally heat-stable form may be a transient form in a continuous process in which, for example, an extruded tube is expanded, whilst hot, to a dimensionally heat-unstable form but in other applications, a preformed dimensionally heat-stable article is deformed to a dimensionally heat-unstable form in a separate stage. In use, since the deformed state of the article is heat-unstable, application of heat will cause the article to assume its original heat-stable shape.

Any polymeric material which can be cross-linked and to which the property of dimensional recoverability may be imparted, such as those disclosed in UK Patent Specification No. 990,235 may be used to form the article. Preferred materials include: polyolefins, e.g. low, medium or high density polyethylene; polypropylene; ethylene copolymers, e.g. with alpha olefins such as propylene, 1-butene, 1-hexene or 1-octene, or vinyl acetate or other vinyl esters or methyl or ethyl acrylate; polyamides, especially Nylon materials, e.g. Nylon 6, Nylon 6,6, Nylon 11 or Nylon 12 or those disclosed in European Patent Specification No. 0055898; segmented thermoplastic polyesters, e.g. having polyester hard phase and polyether soft phase; ethylene/methyl acrylate copolymers and terpolymers or polyurethanes. The disclosures of the above patent specifications are incorporated herein by reference. Different polymers or mixtures of polymers may be used in the respective opaque and transparent portions of the article, provided that compatibility at the interface between the different portions as adequate to withstand the forces of expansion and heat-recovery in use.

The respective transparent and opaque portions of the article may be formed by known techniques, a preferred method being coextrusion of relatively opaque polymeric material and relatively transparent polymeric material to form stripes or other patterns of the transparent and opaque portions in the finished article.

The polymeric composition may be cross-linked either by the incorporation of a chemical crosslinking agent or by exposure to high energy radiation, using well known techniques and materials.

Preferably, at least part of the article according to the invention which is relatively transparent extends from the external surface to the internal surface of the article. This has the advantage that in use some of the electromagnetic radiation, for example visible light, incident upon the article may pass through the article from its exterior to its hollow interior and be reflected back by a substrate which may therefore be viewed. However, the article according to the invention may carry one or more internal inserts liners, layers or the like and this may extend across at least part of the relatively transparent portion of the article. The article may, for example, include one or more fusible inserts, liners, layers or the like, which may be formed from polymeric material or from solder, the melting of which during heat recovery of the article may be observed through the transparent portions, and may result in the enclosed object becoming observable.

The expressions 'external surface', 'internal surface', 'exterior' and 'hollow interior' as used herein with references to articles according to the invention that have an open configuration refer to the article in use once it has been closed or wrapped to form a hollow article.

It has been found that the relative proportions of the relatively transparent and relatively opaque portions can often affect the properties of the article. These proportions can normally be preselected in order to obtain the properties that are desired. For example, where the properties of a relatively opaque material are desired to be the dominant properties of the article, it is normally advantageous for the total mass of the relatively opaque material of the article to be greater than the total mass of the relatively transparent material of the article, and preferably the relatively opaque material comprises at least 50%, more preferably at least 60%, especially at least 70%, more especially at least 80% and most especially at least 90%, e.g. at least 95% of the mass of the article. Alternatively, where the properties of a relatively transparent material are desired to be dominant, the relatively transparent material may, for example, comprise at least 50%, preferably at least 60%, more preferably at least 70%, especially at least 80%, more especially at least 90% and most especially at least 95% of the mass of the article.

Depending on the type of properties which the article is desired to have, the relative proportions of the relatively opaque and relatively transparent portions of the article may be defined in units other than those of mass or weight, for example volume or surface area. The relative proportions of the surface of the article which are relatively opaque or relatively transparent may, for example, have an effect upon the absorption of infrared or microwave radiation by the article and hence the rate at which the article recovers dimensionally when heated by infrared or microwave radiation.

In a preferred embodiment of the invention the total external surface area of the article which is relatively opaque is greater than that which is relatively transparent, and preferably the relatively opaque material comprises at least 50%, more preferably at least 60%, especially at least 70%, more especially at least 80% and most especially at least 90%, e.g. at least 95% of the external surface area of the article. Alternatively, however, it may be desirable for most of the external surface area of the article to be relatively transparent. For example, in one preferred embodiment of the invention at least part of the article which is opaque comprises at least one thermochromic material. Because the relatively opaque material in this instance is used as an indicator, it is often not necessary for the material to comprise more than half of the external surface area of the article. In certain preferred embodiments of the invention therefore, the relatively transparent material comprises at least 50%, more preferably at least 60%, especially at least 70%, more especially at least 80% and most especially at least 90%, e.g. at least 95% of the external surface area of the article.

Preferably, at least part of the article according to the invention which is relatively opaque includes at least one non polymeric additive. Often, the relative opacity of part of the article will be due, at least in part, to the presence of at least one non-polymeric additive. Examples of types of non-polymeric substances which may be included are: antioxidants, reinforcing and non-reinforcing fillers, flame retardants, plasticisers, pigments, stabilisers, cross-linking promoters, e.g. prorads, lubricants and the like.

In a preferred embodiment of the invention, the or at least one of the non-polymeric additive(s) comprises a flame retardant. It is particularly preferred for the flame retardant to be halogen-free. Examples of flame-retardants which may be used include aluminium trihydrate, red phosphorous, mixtures of red phosphorous and one or more ammonium phosphates, antimony trioxide, antimony pentoxide and magnesium hydroxide either alone or in any combination.

It is particularly preferred that at least part of the article according to the invention which is relatively opaque includes at least one non-polymeric flame retardant additive and at least part of the article which is relatively transparent includes substantially no non-polymeric flame retardant additive or other opacifying additive. Depending on the particular requirements of the article, the or each relatively transparent portion may comprise a halogenated polymer composition, but it is preferred that the article is substantially halogen free.

It is sometimes advantageous for the relatively transparent and the relatively opaque portions of the article to have different degrees of dimensional recoverability. For example, in one preferred embodiment of the invention at least part of the article which is relatively transparent has a greater degree of dimensional recoverability than at least part of the article which is relatively opaque. This has an advantage in that the proportion of the external surface area of the article which is relatively transparent may, for example, be made sufficiently large that positioning the article with respect to a substrate is relatively easy, but once the article has been recovered about the substrate, the or each relatively transparent portion recovers to a greater degree than does the or each relatively opaque portion so that in the recovered article the proportion of the external surface which is relatively opaque is greater than that before recovery. Preferably, prior to recovery the proportion of the external surface area of the article which is relatively transparent is greater than that which is relatively opaque, but subsequent to recover the greatest proportion of the article's external surface area is relatively opaque.

It may sometimes be possible to obtain differing degrees of dimensional recoverability automatically due to the inherent differences between the compositions of the relatively opaque and relatively transparent portions respectively. Additionally or alternatively, the degree of dimensional recoverability of each portion may be preselected, for example by selecting polymer compositions which have different elastic moduli, for the relatively opaque and relatively transparent portions of the article, or by adding different levels of cross-linking promoters and/or inhibitors to each portion. Irradiation of the article during manufacture then normally imparts different degrees of cross-linking to the different portions and hence different degrees of dimensional recoverability. This effect may often be achieved or enhanced by expanding the different portions of the article by different amounts.

The shape, form, pattern or configuration of the relatively transparent and relatively opaque portions respectively of the article according to the invention may normally be chosen as required. A preferred embodiment of the invention is one in which at least part of the article which is relatively transparent has the form of at least one stripe.

As mentioned above, according to a preferred embodiment of the invention, the article is substantially tubular in shape. For substantially tubular articles, it is often advantageous for at least part of the article which is relatively transparent to have the form of at least one longitudinal stripe. This has a benefit in that it normally provides ease of positioning of the article with respect to an elongate substrate, e.g. an electrical connection between a plurality of elongate electrical conductors. It is sometimes particularly advantageous to provide the article with a plurality of transparent longitudinal stripes. Alternatively, at least part of a substantially tubular article according to the invention which is relatively transparent may have the form of at least one helical stripe or the form of at least one stripe which extends substantially around the circumference of the article. An advantage of these forms of stripe is that they normally provide ease of positioning of the article with respect to a substrate regardless of the angular orientation of the article.

Also as mentioned above, according to another aspect, the invention provides a method of enclosing at least part of a substrate. For embodiments of the invention wherein the article has an open configuration, placing the article around at least part of a substrate preferably comprises wrapping the article around at least part of the substrate. Alternatively, for embodiments of the invention wherein the article is hollow, placing the article around at least part of a substrate preferably comprises sliding the article onto the substrate. Preferably, the substrate comprises a plurality of elongate objects, especially elongate electrical conductors, e.g. wires or cables. The article may be especially useful for enclosing connections between such wires or cables.

According to a further aspect, the invention provides an assembly which comprises a substrate at least partly enclosed by heat recovery thereon of an article according to the invention.

We claim:

1. An article for enclosing at least part of a substrate in an interior of said article, at least part of said article being dimensionally heat-recoverable polymeric material comprising in its heat-recoverable state a co-molded or co-extruded unitary construction which includes (i) at least one relatively transparent portion and (ii) at least one relatively opaque portion; wherein said relatively transparent portion is relatively transparent through its entire thickness so that at least a portion of said substrate which is enclosed by said article is observable.

2. An article according to claim 1, wherein the position of the substrate is detectable through said transparent portion when the substrate is enclosed by the article in use.

3. An article according to claim 1, wherein at least one of the said opaque portion and the said transparent portion is heat-recoverable.

4. An article according to claim 1, which has a heat-recoverable wall, wherein said opaque and transparent portions are integral.

5. An article as claimed in claim 1 which is hollow, or which is of open form and can be wrapped around the substrate to form a hollow enclosure.

6. An article according to claim 1, wherein said opaque portion comprises at least one additive, which additive is substantially absent from said transparent portion.

7. An article according to claim 6, wherein said additive is present in sufficient concentration in said opaque portion, and said opaque portion constitutes a sufficient proportion of said article, to achieve a preselected level of effect from said article as a whole.

8. An article according to claim 1, wherein a material constituting said opaque portion has a characteristic other than opacity which is not present in said transparent portion, and relative proportions of said opaque and transparent portions in the article are such as to achieve a preselected degree of said characteristic in said article as a whole.

9. An article as claimed in claim 1, wherein said relatively transparent portion and said relatively opaque portion are relatively transparent and opaque respectively to visible light.

10. An article as claimed in claim 9, wherein said relatively opaque portion is substantially completely opaque to visible light.

11. An article as claimed in claim 1, wherein the total external surface area of said article which is relatively opaque is greater than that which is relatively transparent.

12. An article as claimed in claim 1, wherein said relatively opaque portion comprises at least one flame retardant material.

13. An article as claimed in claim 12, wherein said relatively transparent portion is substantially free of the said flame retardant material.

14. An article as claimed in claim 1, wherein said relatively transparent portion has a greater degree of dimensional recoverability than said relatively opaque portion.

15. An article as claimed in claim 1, wherein said relatively transparent portion forms at least one stripe.

16. An article as claimed in claim 1, which is substantially tubular in shape.

17. An article as claimed in claim 15, wherein said relatively transparent portion forms at least one longitudinal or helical stripe.

18. An article according to claim 1, wherein said opaque portion is substantially halogen-free.

19. An article according to claim 1, carrying at least one internal insert, liner or layer extending across the relatively transparent portion.

20. An article according to claim 1, wherein the position of the substrate can be detected through said transparent portion at least one of before and after heat recovery of said article.

21. A method of enclosing at least part of a substrate, which comprises:

(a) placing an article, at least part of which is comprised of a dimensionally heat-recoverable polymeric material of a co-molded or co-extruded unitary construction which, in its heat-recoverable state, includes (i) at least one integral relatively transparent portion and (ii) at least one integral relatively opaque portion; wherein said relatively transparent portion is relatively transparent through its entire thickness so that at least a portion of said substrate which is enclosed by said article is observable around at least part of a substrate;

(b) positioning said article with respect to said substrate by detecting a position of said substrate through at least part of said article which is relatively transparent; and (c) heating said article, thereby causing at least a part of said article to recover about said substrate.

22. A method as claimed in claim 21, wherein said position of said substrate is detected visually.

23. A method as claimed in claim 21, wherein the substrate comprises a plurality of elongate electrical conductors.

24. An assembly which comprises a substrate at least partly enclosed by heat recovery thereon of an article, at least part of which is comprised of a dimensionally heat-recoverable polymeric material of a co-molded or co-extruded unitary construction which, in its heat-recoverable state, includes (i) at least one integral relatively transparent portion and (ii) at least one integral relatively opaque portion; wherein said relatively transparent portion is relatively transparent through its entire thickness so that at least a portion of said substrate which is enclosed by said article is observable.

25. An article according to claim 18, wherein said relatively transparent portion is substantially halogen-free.

26. An assembly according to claim 24, wherein the substrate comprises a plurality of elongate electrical conductors.

\* \* \* \* \*